United States Patent
Soika

(10) Patent No.: US 6,393,370 B1
(45) Date of Patent: May 21, 2002

(54) METHOD FOR ASSESSING THE MEASURING ACCURACY OF A SENSOR DESIGNED TO MEASURE THE DISTANCE ON AN OFF-LINE MOBILE SYSTEM

(75) Inventor: Martin Soika, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/269,982

(22) PCT Filed: Sep. 8, 1997

(86) PCT No.: PCT/DE97/01988

§ 371 Date: Apr. 5, 1999

§ 102(e) Date: Apr. 5, 1999

(87) PCT Pub. No.: WO98/15847

PCT Pub. Date: Apr. 16, 1998

(30) Foreign Application Priority Data

Oct. 7, 1996 (DE) .......................................... 196 41 261

(51) Int. Cl.[7] ................................................ G05D 1/00
(52) U.S. Cl. ............................. 702/97; 702/33; 702/85; 702/104; 702/150
(58) Field of Search ............................. 702/33, 36, 81, 702/82, 85, 94, 95, 97, 104, 116, 122, 150–153, 158, 179–184, 188; 701/96, 301; 342/134; 340/903, 345, 943; 382/106; 367/99, 117; 700/288, 289

(56) References Cited

U.S. PATENT DOCUMENTS

| | | | | |
|---|---|---|---|---|
| 5,006,988 A | * | 4/1991 | Borenstein et al. | 364/424.02 |
| 5,357,598 A | * | 10/1994 | Ishihara et al. | 395/90 |
| 5,416,713 A | * | 5/1995 | Kameda et al. | 364/461 |
| 5,537,017 A | * | 7/1996 | Feiten et al. | 318/587 |
| 5,545,960 A | * | 8/1996 | Ishikawa | 318/587 |
| 5,677,836 A | * | 10/1997 | Bauer | 364/424.07 |
| 5,684,695 A | * | 11/1997 | Bauer | 364/424.027 |
| 5,793,934 A | * | 8/1998 | Bauer | 395/85 |
| 5,804,942 A | * | 9/1998 | Jeong | 318/580 |
| 6,004,016 A | * | 12/1999 | Spector | 364/167.02 |
| 6,125,191 A | * | 9/2000 | Mashimo et al. | 382/104 |

OTHER PUBLICATIONS

Proceedings of the International Workshop in Munich, Germany Mar. 6–8, 1991, Springer–Verlag, Berlin, Germany, 1991.
Proceedings of the 1992 IEEE Internat. Conference on Robotics and Automation, Nice, France, May 1992.
IEEE Journal of Robotics and Automation, Jun. 1987, USA, Bd. RA–3, Nr. 3, Seiten 249–265.
Computer, Bd. 22, Nr. 6, Juni 1989, Seiten 46–57.

(List continued on next page.)

Primary Examiner—Marc S. Hoff
Assistant Examiner—Carol S. W. Tsai
(74) Attorney, Agent, or Firm—Schiff Hardin & Waite

(57) ABSTRACT

The invention discloses an evaluation method for the quality of measuring sensors of an autonomous mobile system. To this end, the plurality of sensors per cell that have surveyed this cell when surveying obstacles for producing a cellularly structured environment map are stored and it is identifiably indicated thereto which sensors have classified this cell in which way. For example, a occupied probability and a free probability is [sic] employed for the classification. The measuring quality is determined with reference to the results that the individual sensors have supplied or the respective cell. The extent to which the classifications of the individual sensors confirm one another is evaluated thereto. Sensors whose measured results deviate from a great number of other sensors are classified as faulty. In order to prevent dynamic objects in the environment from falsifying the quality statement, the system can implement a self-test in that it turns around its own axis within a static but not necessarily known environment and subsequently undertakes the evaluation of the sensors.

10 Claims, 6 Drawing Sheets

OTHER PUBLICATIONS

Proc. 1st IFAC Int. Workshop on Intelligent Autonomous Vehicles, Apr. 1993.

IEEE Transactions on Robotics and Automation, vol. 6, No. 2, Apr. 1990.

IEEE Transaction on Robotics and Automation, vol. 7, No. 3, 1991.

IEEE Transactions on Systems, Man, and Cybernetics, 19 (5), 1998, 1179–1187.

Proc. Of the SPIE—The International Society for Optical Engineering, 1003, 1988, 2–11.

* cited by examiner

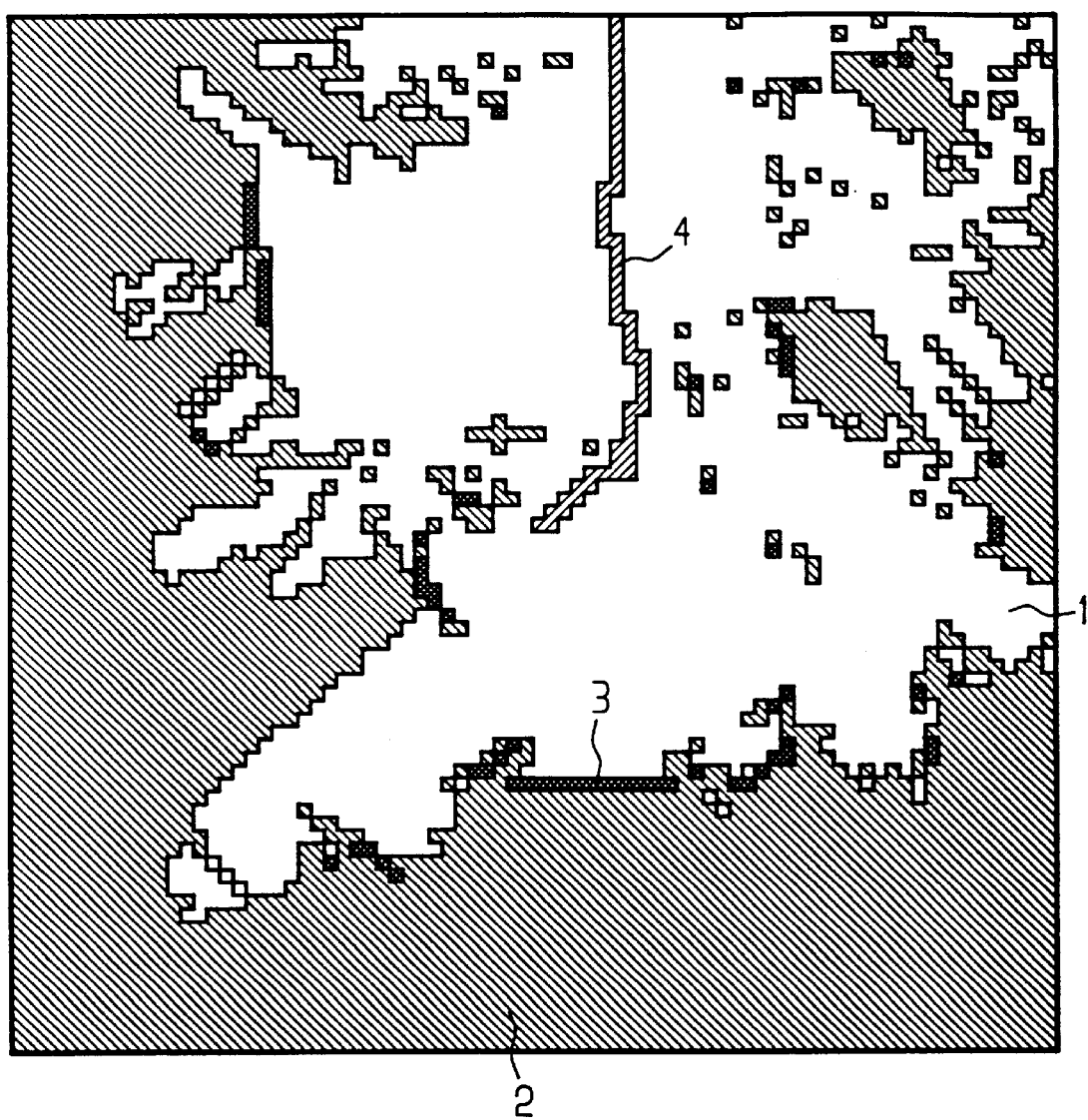

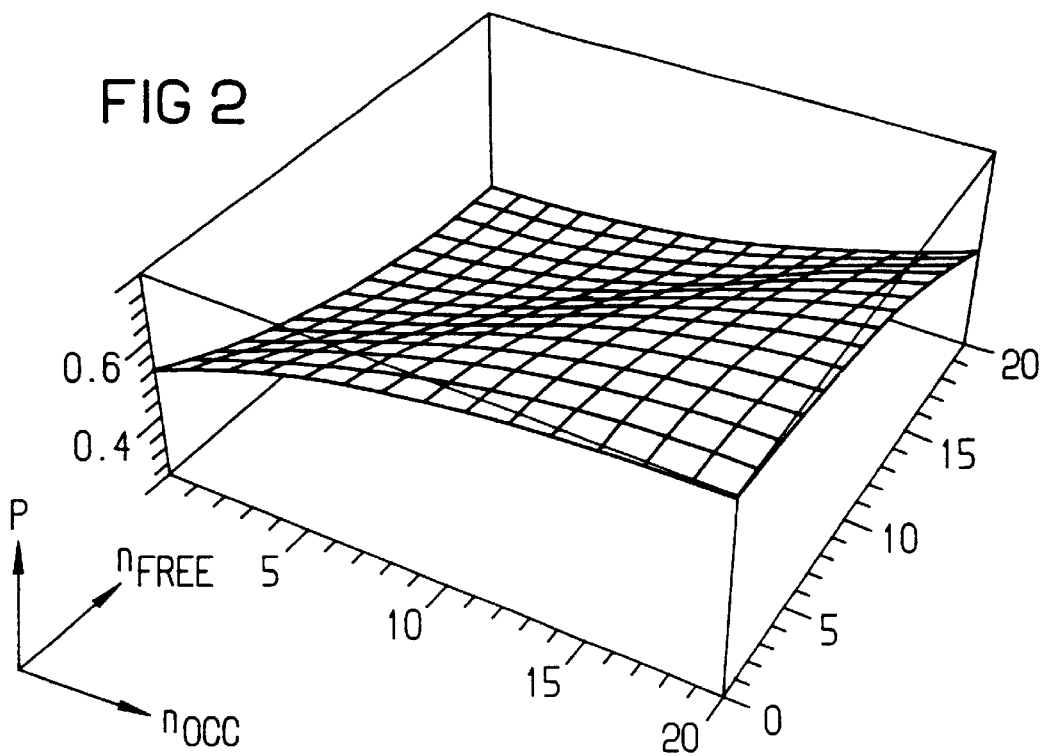
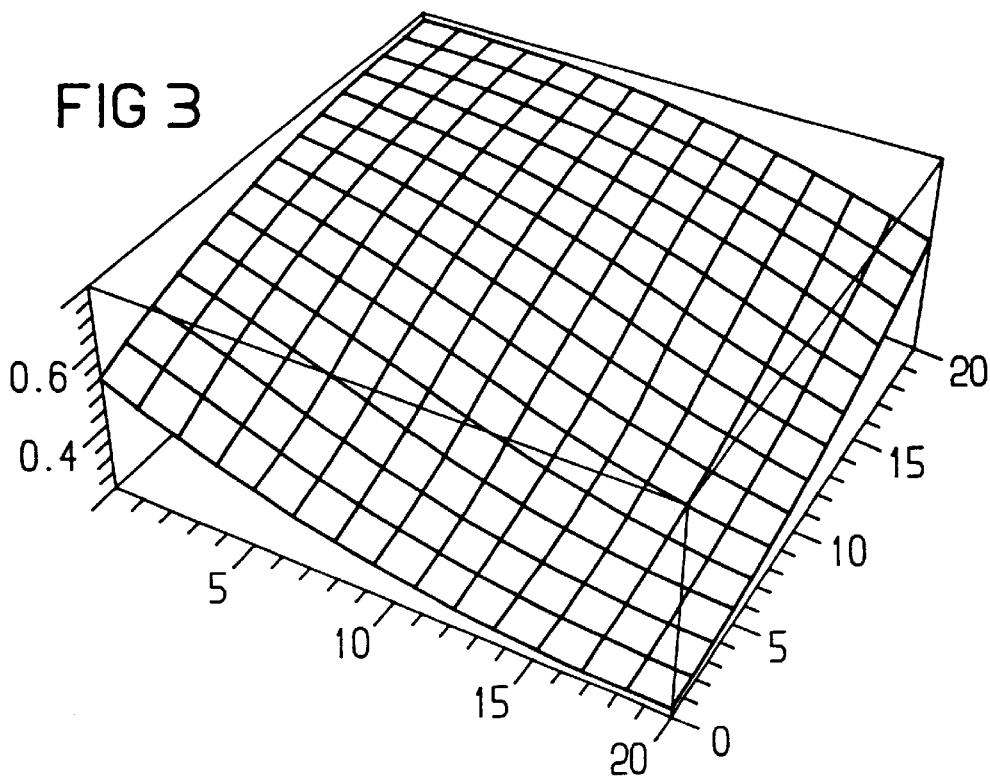

METHOD FOR ASSESSING THE MEASURING ACCURACY OF A SENSOR DESIGNED TO MEASURE THE DISTANCE ON AN OFF-LINE MOBILE SYSTEM

BACKGROUND OF THE INVENTION

1. Field of the invention

The present invention is directed to a method for evaluating the quality of distance measurements and of the appertaining measurement sensors that make it possible for an autonomous mobile system to construct a cellularly structured map of its environment.

2. Description of the Related Art

Given employment of autonomous mobile systems (AMS) in unprepared, everyday environments, these environments not being known a prior to the AMS or, respectively, only in part, it is necessary for the AMS to perceive its surroundings with suitable sensors. For example, see Rencken, W. D., Leuthäusser, I., Bauer, R., Feiten, W., Lawitzky, G., Möller, M., Low-Cost Mobile Robots for Complex Non-Production Environments, Proc. 1st IFAC Int. Workshop on Intelligent Autonomous Vehicles, April 1993. An environment model is then constructed from the sensor measurements, preferably in the form of a cellularly structured environment map, that takes the respective inadequacies of the measuring principle or of the sensor mechanism itself such as, for example, systematic measuring errors into consideration See for example Beckerman, M., Oblow, E. M., Treatment of Systematic Errors in the Processing of Wide-Angle Sonar Sensor Data for Robotic Navigation, IEEE Transactions on Robotics and Automation, Vol. 6, No. 2, April 1990. For handling a commanded task, the AMS implements, for example, functions such as obstacle avoidance, navigation and localization dependent on the momentary surroundings. Mismeasurements can jeopardize the success of such operations. First, undetected obstacles can lead to collisions; second, "ghost obstacles" deteriorate the freedom of mobility of the system. The success of the system operation to be implemented is accordingly highly dependent on the condition of the sensors. Errors of the sensor mechanism beyond the limits that are specified and tolerable within the appertaining application must therefore be dependably recognized. The following error recognition demands are made of the sensors thereof on the basis of the desired, typical use environments of autonomous mobile systems:

independence from the surroundings:
   no reference or calibration environments should be necessary.
independence from the type of error:
   due to the multitude of error types that are generally not known a priori, the approach should optimally cover all error types that can involve a significant deterioration of the environment model.
online capability:
   a constant monitoring of the sensors should be possible for safety reasons.

Sensors are mainly secured to the circumference of a mobile robot for reasons of maximizing the range of perception. As a result thereof, however, they are exposed in part to considerable mechanical stresses due to collisions with external objects. In addition to hardware defects of a sensor, considerable deterioration of the imaging properties of an inherently physically functional sensor can occur due to mechanical influences.

Methods for producing cellularly structured environment maps of autonomous mobile systems are known from the Prior Art. For example, cellularly structured maps are employed that use occupied and free probabilities per cell for marking obstacles and for route planning based thereon see the publications Borenstein, J., Koren, Y., The Vector Field Histogram—Fast Obstacle Avoidance for Mobile Robots, IEEE Transactions on Robotics and Automation, Vol. 7, No. 3, 1991 and Borenstein, J., Koren, Y., Real-Time Obstacle Avoidance for Fast Mobile Robots, IEEE Transactions on Systems, Man, and Cybernetics, 19(5), 1989, 1179–1187For example, they are constructed by the incoming measurements M with the assistance of a simplified probabilistic sensor model, refer to the publication Matthies, L., Elfes, A., Probablistic [sic] Estimation Mechanisms and Testrelated [sic] Representations for Sensor Fusion, Proc. of the SPIE—The International Society for Optical Engineering, 1003, 1988, 2–11.

Solutions for error recognition and calibration for sensor mechanisms of autonomous mobile systems (AMS) without employing reference models and calibration members are hitherto unknown.

SUMMARY OF THE INVENTION

An object underlying the invention is therefore comprised in specifying a method that enables the recognition of sensor errors of an autonomous mobile system on the basis of a cellularly structured presentation of its surroundings and, moreover, supports the calibration of measuring sensors in unprepared environments.

This object is achieved by a method for evaluating the measuring quality of a distance-measuring sensor at an autonomous mobile system, including:

a) obstacles in the environs of the system are measured by a plurality of distance-measuring sensors located at the autonomous mobile system and cells of a cellularly structured environment map corresponding in position with the environs are characterized with respect to their occupancy state with obstacles on the basis of the measured results;

b) which sensors have measured a respective cell is noted for this cell identifiable per measuring sensor;

c) the measuring quality of a first measuring sensor is evaluated, at least with respect to a first cell, to see how many other measuring sensors arrive at the same characterization of the occupancy state with respect to the occupancy state of the first cell, whereby the measuring quality of the first sensor is evaluated all the greater the more of the other sensors confirm its characterization.

Developments of the invention provide that the occupancy state of a respective cell is characterized according to an occupied and free probability, whereby the assigning of the respective probabilities is based on how many measuring sensors have measured an obstacle or, respectively, no obstacle there. The measuring quality of a measuring sensor $S_j$ is evaluated as follows as a probability P for the sensor condition:

$$P(Y(S_j)=OK|\{K(C)\}_t)=P(S_j|\{K\}_t)$$
$$P(Y(S_j)=KO|\{K(C)\}_t)=P(\neg S_j|\{K\}_t)=1-P(S_j|\{K\}_t)$$

with the random variables Y and the statusses OK and KO for functional and malfunctioning, whereby this depends on the consistency K of the cells $\{C\}$ evaluated up to the point in time t and the consistency represents a criterion for the extent to which the characterization of a measuring sensor $S_j$ coincides with the characterizations of other measuring sensors with respect to the map cell $C_i$ under consideration. In a preferred embodiment, a consistency measure according to:

$$P(K_i|S_j)=P(K(C_i)=CON|Y(S_j)=OK)$$

$$P(K_i|\neg S_j)=P(K(C_i)=CON|Y(S_j)=KO)$$

is assigned for a measuring sensor and the probability for the sensor condition is updated according to:

$$P(S_j|\{K\}_i) = \frac{P(K_i|S_j)\cdot P(S_j|\{K\}_{i-1})}{(P(K_i|S_j)\cdot(P(S_j|\{K\}_{i-1})+P(K_i|\neg S_j)\cdot P(\neg S_j|\{K\}_{i-1})} \quad (15)$$

The probability $P(S_j|\{K\}_i)$, dependent of the occupation state characterized by the measuring sensor as right $P_{ok}$ or wrong $P_{ko}$, is at least calculated as:

$$P_{ok}(S_j)=P(C_i|\{M_{k,k=j}\}_i, M_j=OCC)=P(C_i|\{M\}_i)$$

$$P_{ko}(S_j)=P(C_i|\{M_{k,k=j}\}_i, M_j=FREE)$$

for a cell characterized as occupied OCC and is at least calculated as:

$$P_{ok}(S_j)=P(C_i|\{M_{k,k=j}\}_i, M_j=FREE)=P(C_i|\{M\}_i)$$

$$P_{ko}(S_j)=P(C_i|\{M_{k,k=j}\}_i, M_j=OCC)$$

for a cell characterized as FREE, with M as plurality of implemented measurements.

The consistency measure is determined at least as:

$$P(K_i|S_j)=\alpha\cdot P_{ok}(S_j)+(1-\alpha)\cdot(1-P_{ok}(S_j))$$

$$P(K_i|\neg S_j)=(1-\alpha)\cdot P_{ko}(S_j)+\alpha\cdot(1-P_{ko}(S_j))$$

whereby how great an effect the evaluation of a map cell has on the sensor evaluation is set with the scale factor $\alpha$.

In the method, different values are selected for $\alpha$ dependent on the characterization of the cell under consideration by the measuring sensor to be evaluated, and the following are valid for characterization as occupied: $\alpha>0.5$ and free: $\alpha<0.5$.

Preferably, only a specific plurality of cells, the evaluation cells, are evaluated, these being carried along by the autonomous mobile system given a movement in the form of an evaluation window of the environs, and whereby evaluation cells that are located immediately at the edge of the evaluation window are evaluated. A self-test may be implemented in that the autonomous mobile unit turns until all measuring sensors have measured at least one obstacle, and the measuring quality of the individual measuring sensors is determined on the basis of the evaluation of a plurality of evaluation cells. In the exemplary embodiments, ultrasound or optical measuring sensors are employed.

A particular advantage of the inventive method is comprised therein that, based on the sensor information about a cell, a quality determination can be made about the supplied measured results of the individual sensors in that the extent to which the sensor results confirm one another is evaluated. By adding further cells from the cellularly structured environment map, the result for the sensor-related quality of the measured results found on the basis of a cell can be confirmed with the desired precision.

The evaluation can be actuated in an especially simple way on the basis of the number of measuring sensors and the number of results with respect to a cell respectively sensend by these sensors. In this way, the computing outlay remains low and a great number of cells can be evaluated united with one another.

Advantageously, a probability for the functionability of a sensor can be indicated according to the inventive method in that the number of previously evaluated cells is utilized as the basis for the evaluation of the sensor. In this respect, an optimum evaluation of the individual sensors is always established with reference to the current measurement status.

Preferably, a consistency criterion of the measuring behavior of individual sensors over a plurality of cells can be indicated according to the inventive method in that the results of appertaining sensors with respect to a plurality of cells of the cellularly structured environment map are evaluated.

Probabilities with respect to incorrectly or correctly supplied measured results can be especially advantageously indicated for individual sensors on the basis of the number of previously supplied measured results per cell and the sensors stored identifiably per cell.

Advantageously, the results that were found according to the inventive method can be cell-specifically provided with a weighting factor because the influence of the respective cell in the evaluation of the respective sensor can thus be set.

Preferably, the respective weighting factors are selected according to the inventive method dependent on a occupied or free status of the cell characterized by the sensor.

Advantageously, those cells that are located at the edge of an observation horizon of the autonomous mobile system are evaluated according to the inventive method since these cells were measured with a maximum number of sensors during the course of the travel of the autonomous mobile system and thus contain a great deal of information that would be lost to the system after these cells leave the observation horizon of the system.

Advantageously, the system can implement a self-test according to the inventive method in that it turns in place and thus measures obstacles in the environs. By turning in place, the obstacles in the environs are successively covered by the individual sensors of the autonomous mobile system and, following thereupon, the measured results of the cells of the environment map can be evaluated in order to identify faulty sensors.

Advantageously, both optical as well as acoustic sensors can be employed for the inventive method.

BRIEF DESCRIPTION OF THE DRAWINGS

The invention is explained in greater detail below with reference to Figures.

FIG. 1 shows a cellularly structured environment map.

FIGS. 2 and 3 are contour graphs in perspective that indicate the degrees of consistency dependent on how many sensors have viewed the appertaining grid cell as occupied or free, whereas the sensor to be evaluated has classified this as occupied.

DETAILED DESCRIPTION OF THE PREFERRED EMBODIMENTS

Figure 4:
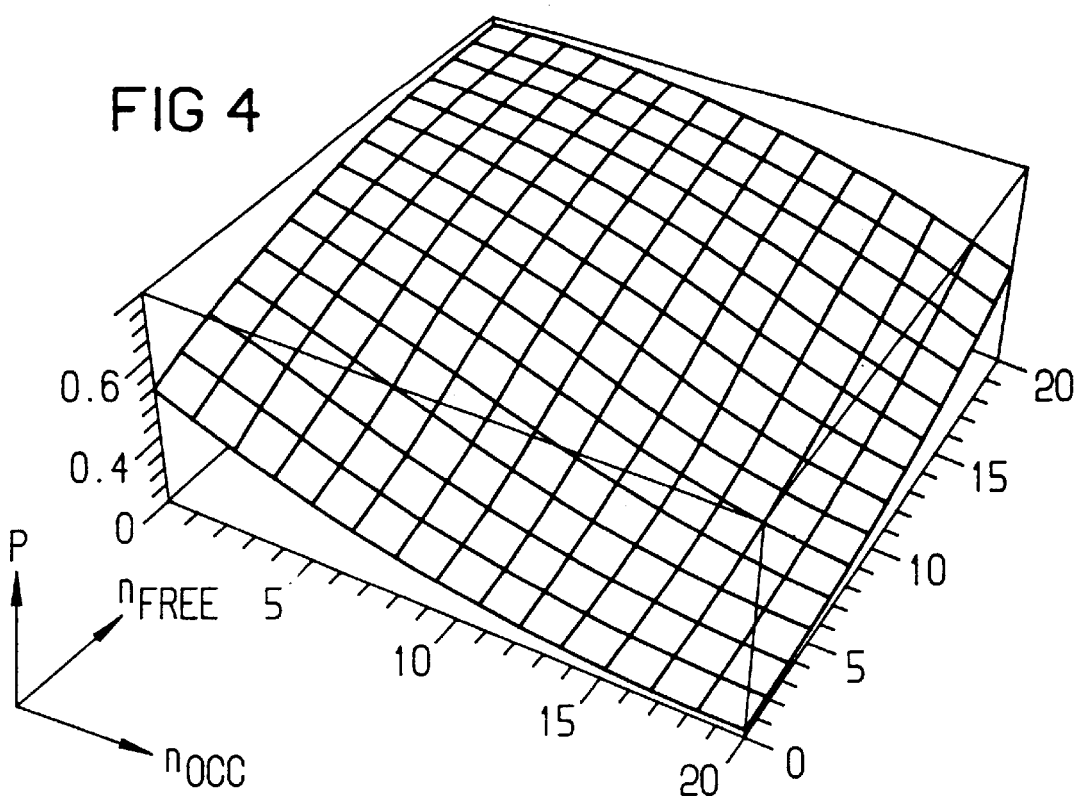
FIGS. 4 and 5 are perspective contour graphs that indicate the degrees of consistency dependent on how many sensors have classified the appertaining grid cell as occupied or free, whereas the sensor to be evaluated as classified this as free.

FIG. 1 shows an environment map character that was constructed according to a method from the Prior Art.

Character 1 references free cells of the cellularly structured environment map; character 2 references cells that have a high probability of not being occupied; and character 3 references cells that represent obstacles with great probability. Character 4 indicates the track of the autonomous mobile system AMS.

In the known system for constructing a cellularly structured environment map U, for example according to Elfes (Elfes, A., Dynamic Control of Robot Perception Using Stochastic Spatial Models, Information Processing in Autonomous Mobile Robots, Proceedings of the International Workshop in Munich, Germany, 6–8 March 1991, Springer-Verlag, Berlin, Germany, 1991, and Elfes, A., Dynamic Control of Robot Perception Using Multi-Property Inference Grids, Proceedings of the 1992 IEEE International Conference on Robotics and Automation, Nice, France, May 1992, this is built up by the incoming measurements M with the assistance of a simplified probabilistic sensor model, (see, Matthies, L., Elfes, A., Probablistic [sic] Estimation Mechanisms and Testrelated [sic] Representations for Sensor Fusion, Proc. of the SPIE—The International Society for Optical Engineering, 1003, 1988, 2–11.). This ideal sensor model is characterized in that its probability density distribution is determined by the Kronacker delta. As a result of the discrete random variable X with the two states OCC (occupied) and FREE (free), the occupation state for each individual cell $C_i$ is described by the probability $$P(X(C_i)=OCC|\{M\}_t)=P(C_i|\{M\}_t)$$

$$P(X(C_i)=FREE|\{M\}_t)=P(\neg C_i|\{M\}_t)=1-P(C_i\{M\}_t) \quad (1)$$

Given a modification of the occupation state as a result of a measurement, the sensors responsible for this measurement are additionally inventively logged. In addition to the occupation probability, accordingly, each cell located in the environment map receives an allocated list of sensors that have "seen" this cell as occupied or, respectively, unoccupied.

Due to the movement of the AMS which uses parallel measuring, repeated determinations about the occupancy state of the cells are made by various sensors from various angles of view. The probabilities which are calculated in this way yield the picture in FIG. 1, whereby:

cells identified with reference character 1: $P(C_i|\{M\}_t) \leq 0.25$ cells marked with reference character 2: $0.25 < P(C_i\{M\}_t) < 0.75$ cells with reference character 3: $P(C_i|\{M\}_t) \geq 0.75$ and cells with reference character 4 mark the track of the vehicle.

Given the assumption that the error-free sensors confirm each others readings, faulty sensors can be recognized on the basis of repeatedly occurring contradictions with respect to the occupancy state of map cells. Map cells with a high degree of veracity about the condition of sensors are, for example, those that exhibit a very high redundancy R $$R(C_i) = 1 - \frac{H(C_i)}{H_{max}(C_i)} \quad (2)$$

with the entropy H, see the publication, Shannon, C. E., Weaver, W., The Mathematical Theory of Communication, University of Illinois Press, 1949.

$$H(C_i)=-\{P(C_i|\{M\}_t \cdot \log_2(P(C_i|\{M\}_t)+P(\neg C_i|\{M\}_t \cdot \log_2(P(\neg C_i|\{M\}_t)\} \quad (3).$$

For example, the following information are available for each cell $C_i$ for the evaluation of the sensors:

$1_{OCC}$ List of the sensors that have characterized this cell as occupied.

$1_{FREE}$ List of the sensors that have characterized this cell as free.

$n_{OCC}$ Number of sensors that have characterized this cell as occupied.

$n_{FREE}$ Number of sensors that have characterized this cell as free.

$P(C_i|\{M\}_t)$ Occupation probability according to Equation (1).

Criteria for the condition of the participating sensors can thus be derived on the basis of each cell. In order to answer the question as to which cells should be evaluated at what points in time, two applied cases can preferably be distinguished:

1. Self-test

Figure 6:
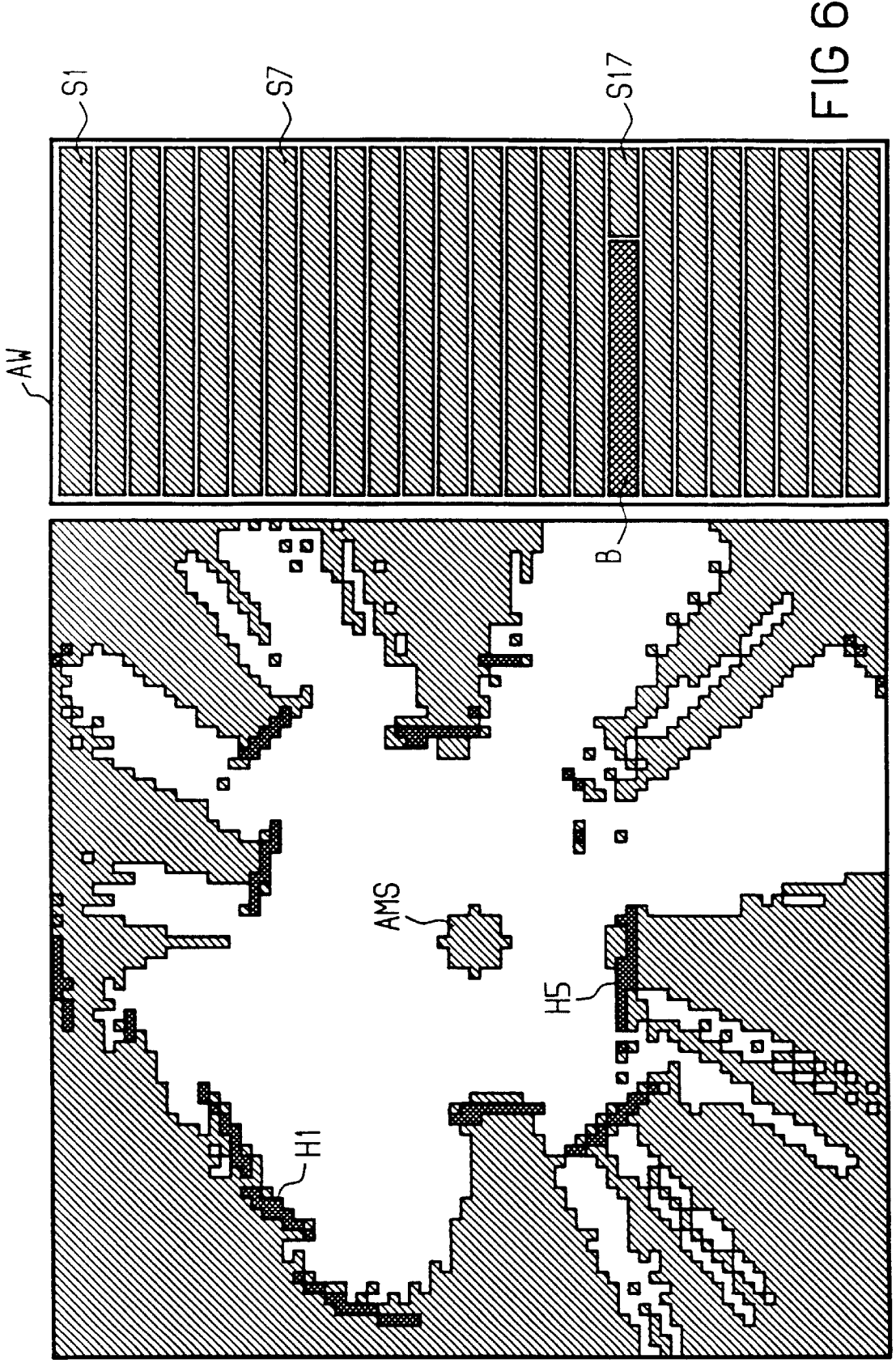
FIG. 6 is an environment map and an evaluation table showing an example for a self-test for the calibration of measuring sensors.

The turning of the AMS in place is particularly suited as a travel maneuver for the implementation of a self-test, as was also explained in FIG. 6. A high overlap of the sensor perception areas and, thus, a high redundancy according to Equation (2) is thus achieved. All map cells are then preferably to be evaluated after the conclusion of the turning motion.

2. Online Monitoring

The often straightline movement of the vehicle leads to that the perception area of all sensors do not overlap. In order to achieve a high redundancy, the map cells should preferably only be evaluated when they are located outside the perception areas of all sensors. On the other hand, for example for reasons of memory space, the vehicle should also carry the map employed. The movement of the vehicle then leads to rows and columns at the edge of the map being deleted. This is necessary so that memory space can be made available for the perception area into which the AMS is advancing. It is precisely these map cells that are important for an online error recognition since they exhibit a maximum of redundancy.

The probability $$P(Y(S_j)=OK|\{K(C)\}_t)=P(S_j|\{K\}_t)$$

$$P(Y(S_j)=KO|\{K(C)\}_t)=P(\neg S_j|\{K\}_t)=1-P(S_j|\{K\}_t) \quad (4)$$

of the random variables Y with the states OK and KO thereby serves for the evaluation of a sensor $S_j$ at a point in time t. This is dependent on the consistency K of the map cells $\{C\}$ evaluated up to the point in time t. The consistency is a measure for the extent to which the reading of a sensor $S_j$ agrees with the reading of other sensors in view of the map cell $C_i$ under consideration. These consistency measures can be derived from the map for each cell for each participating sensor $S_j$, i.e. this sensor is entered in at least one of the aforementioned lists.

$$P(K_i|S_j)=P(K(C_i)=CON|Y(S_j)=OK)$$

$$P(K_i|\neg S_j)=P(K(C_i)=CON|Y(S_j)=KO) \quad (5)$$

The conditional probability $P(K_i|S_j)$ describes the consistency when the reading of the sensor is correct, $P(K_i|\neg S_j)$ given the hypothetical assumption that the sensor is mistaken about its reading.

The probabilities for the sensor condition can then be updated from Equation (4) as follows with the assistance of the consistency measures upon employment of Bayes' rule.

$$(S_j | \{K\}_i) = \frac{P(K_i | S_j) \cdot P(S_j | \{K\}_{i-1})}{(P(K_i | S_j) \cdot (P(S_j | \{K\}_{i-1}) + P(K_i | \neg S_j) \cdot P(\neg S_j | \{K\}_{i-1})}$$

The consistency of a cell $C_i$ in view of a characterization of the occupancy state by a sensor $S_j$ is described in Equation (5) by a probability.

This is dependent on whether the characterization of the sensor $S_j$ for this map cell was right (OK) or wrong (KO), as defined below. First, the occupation probabilities of the appertaining cell of the environment map U for two cases are calculated therefor. $P_{ok}$ corresponds to the hypothetical occupation probability when the sensor $S_j$ undertakes a true characterization; $P_{ko}$ is the hypothetical probability when the sensor $S_j$ undertakes a false characterization. Dependent on whether the appertaining sensor characterizes the map cell as occupied (OCC) or free (FREE), these probabilities are calculated as OCC:

$$P_{ok}(S_j)=P(C_i|\{M_{k,k=j}\}_t, M_j=OCC)=P(C_i|\{M\}_t)$$

$$P_{ko}(S_j)=P(C_i|\{M_{k,k=j}\}_t, M_j=FREE) \quad (7)$$

FREE:

$$P_{ok}(S_j)=P(C_i|\{M_{k,k=j}\}_t, M_j=FREE)=P(C_i|\{M\}_t)$$

$$P_{ko}(S_j)=P(C_i|\{M_{k,k=j}\}_t, M_j=OCC) \quad (8)$$

With the assistance of Equation (9), these quantities are imaged into the consistency quantities.

$$P(K_i|S_j)=\alpha \cdot P_{ok}(S_j)+(1-\alpha) \cdot (1-P_{ok}(S_j))$$

$$P(K_i|\neg S_j)=(1-\alpha) \cdot P_{ko}(S_j)+\alpha \cdot (1-P_{ko}(S_j)) \quad (9)$$

How strong an effect the evaluation of a map cell should have on the sensor evaluation can be set with the parameter α as a weighting factor. Dependent on the characterization of the occupation state by the sensor under consideration, various values are to be preferably selected for α:

$$OCC: \alpha > 0.5$$

$$FREE: \alpha < 0.5$$

The evaluation of the map cell $C_i$ has all the greater an influence on the evaluation of the sensor $S_j$ the greater the distance of α from 0.5

Figure 5:
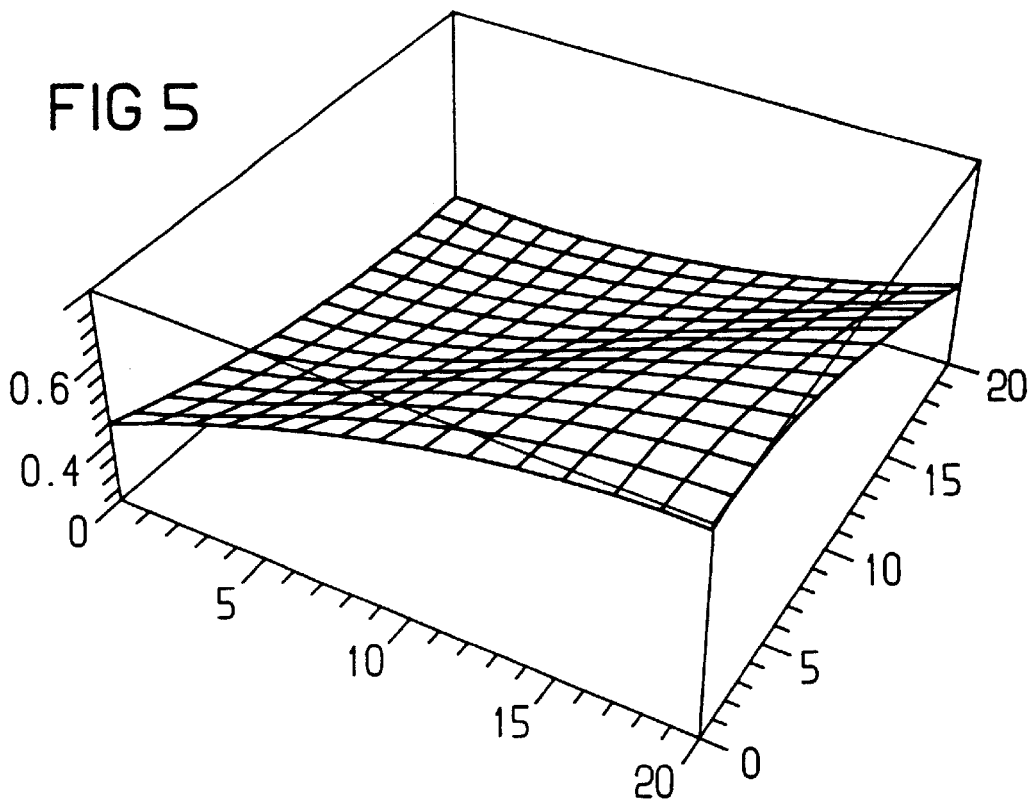

FIGS. 2 and 3 shows the consistency measures $P(K_i|S_j)$ and $P(K_i|\neg S_j)$ dependent on how many sensors have classified the appertaining map cell as occupied or, respectively, free. The probability P is entered toward the top, the number of free cells $n_{FREE}$ toward the back and the number of occupied cells $n_{OCC}$ toward the right. This type of axis division also applies to FIGS. 4 and 5. It is assumed in FIGS. 2 and 3 that the appertaining sensor to be evaluated has characterized the respective grid cells as occupied. It is assumed in FIGS. 4 and 5 that the appertaining sensor has characterized the respective cells as free. In FIGS. 2 and 3, the presentation ensues for that case wherein an OCC characterization was undertaken and α amounts to 0.75. In FIG. 4, the presentation ensues for that case wherein a FREE characterization was undertaken and α amounts to 0.25. The following becomes clear on the basis of the illustration:

For map cells with $n_{FREE}=n_{OCC}$, the occupation probability amounts to 0.5 and practically no redundancy exists in the information of this cell. No secure determination can therefore be made about the condition of the appertaining sensors. The consistency measures, accordingly, are nearly 0.5 and, in combination with Equation (6) have hardly any influence on the sensor evaluation.

Highly different $n_{FREE}$ and $n_{OCC}$ lead to consistency measures different from 0.5 that, in combination with Equation (6), express Confirmation $P(K_i|S_j)>0.5$ $P(K_i|\neg S_j)<0.5$ or, respectively, Contradiction $P(K_i|S_j)<0.5$ $P(K_i|\neg S_j)>0.5$.

The decision whether a specific sensor is classified as malfunctioning or functional can be implemented on the basis of thresholds for $P(S_j|\{K\}_t$. The possibility of a sensor calibration is available in addition to the recognition of sensor defects in an unknown environment. The job of a sensor calibration is to determine the parameters P of a functional relationship f $$A=f(M;P) \quad (10)$$

between a sensor measured value M and a further-processable statement A. To that end, the appertaining statement A is preferably required for each measurement M. The approach is based on generating the reference statements by measurements of other functional and adequately well-calibrated sensors. The statements of the incoming sensor measurements refer to the occupancy state of the appertaining cell. The question about a cell that corresponds to a measured sensor value is answered by the relationship $$C=f(M;P) \quad (11).$$

For identifying the relationship, i.e. the determination of the relevant parameters P, a secured occupation hypothesis for the appertaining cell C must be determined for a measurement by evaluating the information stored in the map. A specific realization for ultrasound distance sensors is described in FIG. 6.

FIG. 6 shows an example of the inventive method with which a self-test for the calibration of measuring sensors of the autonomous mobile system AMS can be implemented. Within its environment, the AMS is located between the obstacles H1 through H5, and appertaining sensors are, for example, indicated in an evaluation table AW with their evaluations. Only the sensors S1, S7 and S17 are referenced in this evaluation table; the test, however, can be implemented for arbitrary sensors of the system without limitation of the invention. According to the inventive method, the sensor S17 is faulty since its measured results are not confirmed by the remaining sensors of the autonomous mobile system AMS in the self-test. The consistency measure is very slight, this being indicated by the large black bar B and a small gray bar. Dependent on the type and number of sensors employed, faulty sensors can, for example, be shut off or indicated or, respectively, calibrated.

Inventively, the recognition of all those sensor errors that lead to contradictions within the map such as, for example, "squinting" sensors→sensors with incorrectly parameterized principal beam axis direction "dreaming" sensors→sensors that see objects that are not present "blind" sensors→sensors that do not perceive any objects is provided and possible. The light gray part of the respective sensor-related bar in FIG. 6 thereby represents the probability $P(S_j|\{K\}_t)$ as a criterion for the freedom from error of a sensor.

The self-test is implemented, for example, in the unprepared use environment of the AMS. This AMS thereby turns by 360° with, for example, an angular speed of approximately 20/s. The measurements are entered online into the map. The map is evaluated after the end of the rotation. A threshold of 0.3 has proven itself for the classification of the sensors. A malfunction of the sensor $S_{17}$ can thereby be detected by the self-test.

Figure 7:
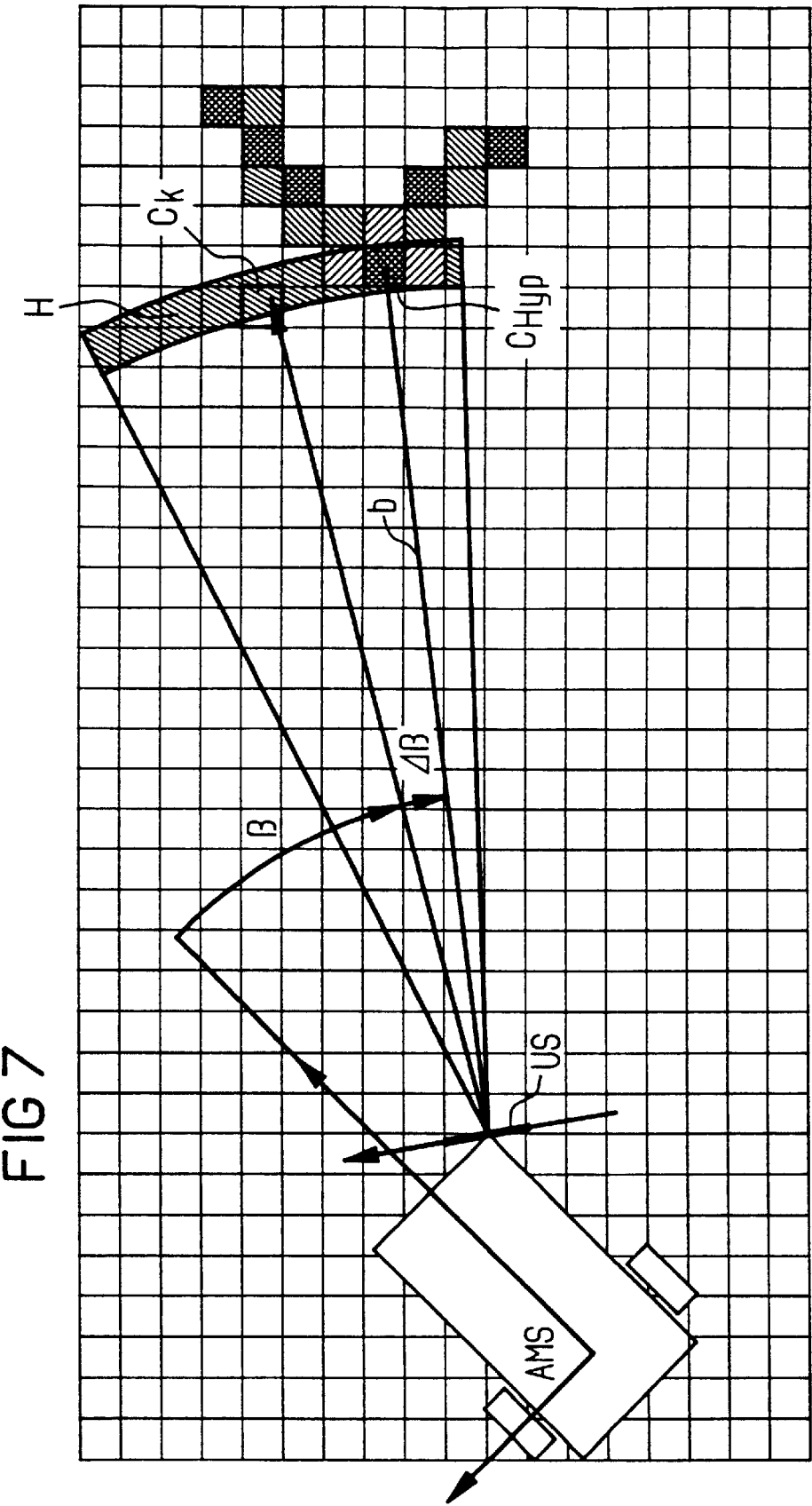
FIGS. 7 and 8 are a plan view and a geometric representation which show an exemplary embodiment for the calibration according to the inventive method.

FIG. 7 shows the calibration of a measuring sensor according to the inventive method with reference to an example. How the constructed environment map can be utilized for a calibration of the participating sensors is thereby shown. The determination of the actual principal beam axis direction b of an ultrasound sensor US in the coordinate system of the AMS is implemented here.

Upon employment of Equation (11), the corresponding map cell $C_k$ of the environment map constructed from the measurements of the other sensors is preferably determined therefor for every measurement $M_k$ of a sensor US with the current sensor parameters $P_j$. Due to the low angular resolution as well as the possible misadjustment of the sensor, the obstacle area H shown in FIG. 7 derives for the actual position of the detected obstacle.

Figure 8:
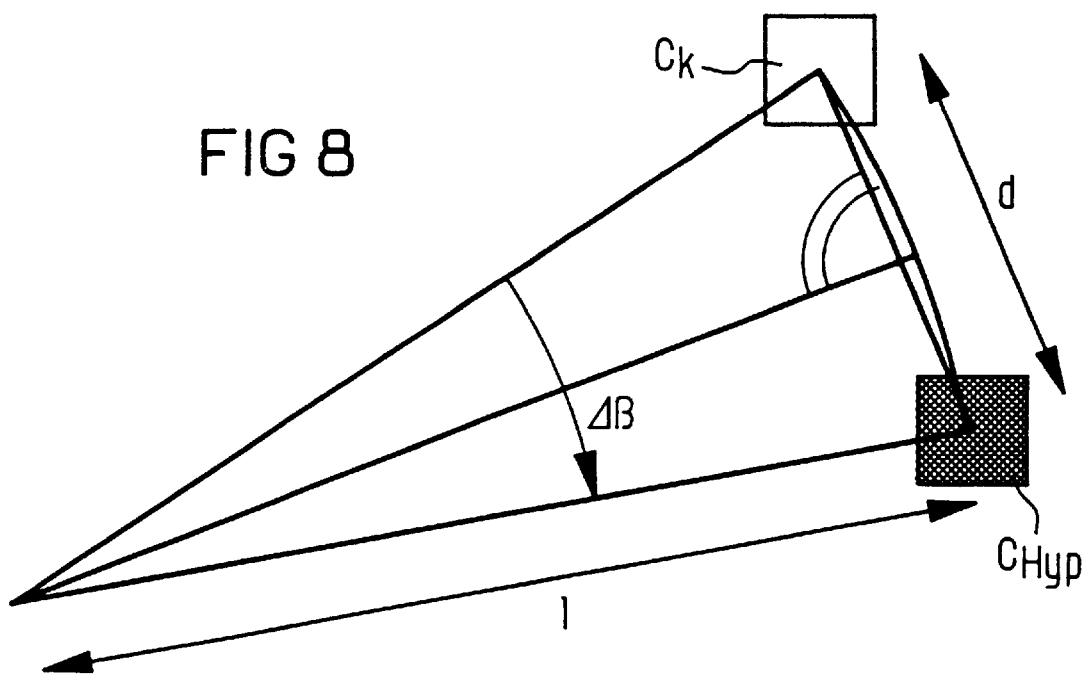

The most probable hypothesis $C_{HYP}$ for the cell belonging to the measurement $M_k$ can be inventively found within this obstacle area H. As shown in greater detail in the auxiliary FIG. 8, the correction value $\Delta\beta$ of the principal beam direction b of the sensor derives as $$\Delta\beta = 2 \cdot \arcsin\left(\frac{d}{2 \cdot l}\right) \quad (12)$$

with 1 as a measured distance and d as a Cartesian distance between the map cells $C_k$ and $C_{HYP}$ and is supplied, for example, to an optimizing method. An extended Kalman filter can preferably be implemented as an algorithm. A transfer of the method onto an application wherein dynamic status variables such as, for example, odometry parameters must also be estimated in addition to static parameters can likewise be realized.

On the basis of this application of the inventive method, the principal beam axis direction was capable of being exactly corrected to ±3°.

Although other modifications and changes may be suggested by those skilled in the art, it is the intention of the inventor to embody within the patent warranted hereon all changes and modifications as reasonably and properly come within the scope of his contribution to the art.

I claim:

1. A method for evaluating a measuring quality of a distance-measuring sensor at an autonomous mobile system, comprising the steps of:
   measuring obstacles in environs of the autonomous mobile system by a plurality of distance-measuring sensors located at the autonomous mobile system;
   characterizing cells of a cellularly structured environment map corresponding in position with the environs with respect to their occupancy state with obstacles on the basis of the measured results;
   noting which sensors have measured a respective cell for a cell identifiable per measuring sensor;
   evaluating a measuring quality of a first measuring sensor at least with respect to a first cell to see how many other measuring sensors arrive at a same characterization of an occupancy state with respect to an occupancy state of a first cell, evaluating the measuring quality of the first sensor all the greater the more other sensors confirm its characterization.

2. A method according to claim 1, further comprising the step of:
   characterizing an occupancy state of a respective cell according to occupied and free probability, assigning of the respective probabilities being based on how many measuring sensors have measured an obstacle or, respectively, no obstacle there.

3. A method for evaluating a measuring quality of a distance-measuring sensor at an autonomous mobile system, comprising the steps of:
   measuring obstacles in environs of the autonomous mobile system by a plurality of distance-measuring sensors located at the autonomous mobile system;
   characterizing cells of a cellularly structured environment map corresponding in position with the environs with respect to their occupancy state with obstacles on the basis of the measured results;
   noting which sensors have measured a respective cell for a cell identifiable per measuring sensor;
   evaluating a measuring quality of a first measuring sensor at least with respect to a first cell to see how many other measuring sensors arrive at a same characterization of an occupancy state with respect to an occupancy state of a first cell, evaluating the measuring quality of the first sensor all the greater the more of other sensors confirm its characterization;
   evaluating the measuring quality of a measuring sensor $S_j$ as follows as a probability P for the sensor condition:

$$P(Y(S_j)=OK|\{K(C)\}_t)=P(S_j|\{K\}_t)$$
   $$P(Y(S_j)=KO|\{K(C)\}_t)=P(\neg S_j|\{K\}_t)=1-P(S_j|\{K\}_t) \quad (13)$$

with random variables Y and statuses OK and KO for functional and malfunctioning, said statuses depending on the consistency K of the cells {C} evaluated up to the point in time t and the consistency represents a criterion for an extent to which characterization of a measuring sensor $S_j$ coincides with characterizations of other measuring sensors with respect to the map cell $C_i$ under consideration.

4. A method according to claim 3, further comprising the step of:
   assigning a consistency measure according to:

$$P(K_i|S_j)=P(K(C_i)=CON|Y(S_j)=OK)$$
   $$P(K_i|\neg S_j)=P(K(C_i)=CON|Y(S_j)=KO) \quad (14)$$

for a measuring sensor and the probability for the sensor condition is updated according to:

$$P(S_j|\{K\}_i) = \frac{P(K_i|S_j) \cdot P(S_j|\{K\}_{i-1})}{(P(K_i|S_j) \cdot (P(S_j|\{K\}_{i-1}) + P(K_i|\neg S_j) \cdot P(\neg S_j|\{K\}_{i-1})} \quad (15)$$

5. A method according to claim 4, further comprising the step of:
   calculating the probability $P(S_j|\{K\}_j)$ dependent of the occupation state characterized by the measuring sensor as right $P_{ok}$ or wrong $P_{ko}$, as:

$$P_{ok}(S_j)=P(C_i|\{M_{k,k=j}\}_t, M_j=OCC)=P(C_i|\{M\}_t)$$
   $$P_{ko}(S_j)=P(C_i|\{M_{k,k=j}\}_t, M_j=FREE) \quad (16)$$

for a cell characterized as occupied OCC and as:

$$P_{ok}(S_j) = P(C_i | \{M_{k,k\neq j}\}_t, M_j = \text{FREE}) = P(C_i | \{M\}_t)$$

$$P_{ko}(S_j) = P(C_i | \{M_{k,k\neq j}\}_t, M_j = \text{OCC}) \quad (17)$$

for a cell characterized as FREE, with M as plurality of implemented measurements.

6. A method according to claim 5, further comprising the steps of:

determining the consistency measure at least as:

$$P(K_i | S_j) = \alpha \cdot P_{ok}(S_j) + (1-\alpha) \cdot (1 - P_{ok}(S_j))$$

$$P(K_i | \neg S_j) = (1-\alpha) \cdot P_{ko}(S_j) + \alpha \cdot (1 - P_{ko}(S_j)), \text{ and} \quad (18)$$

setting how great an effect the evaluation of a map cell has on the sensor evaluation with the scale factor $\alpha$.

7. A method according to claim 6, further comprising the step of:

selecting different values for $\alpha$ dependent on the characterization of the cell under consideration by the measuring sensor to be evaluated, and the following are valid for characterization as occupied: $\alpha > 0.5$ and free: $\alpha < 0.5$.

8. A method according to claim 1, further comprising the step of:

evaluating only a specific plurality of cells as evaluation cells, said evaluation cells being carried along by the autonomous mobile system given a movement in a form of an evaluation window of the environs, and evaluating evaluation cells that are located immediately at an edge of the evaluation window.

9. A method for evaluating a measuring quality of a distance-measuring sensor at an autonomous mobile system, comprising the steps of:

measuring obstacles in environs of the autonomous mobile system by a plurality of distance-measuring sensors located at the autonomous mobile system;

characterizing cells of a cellularly structured environment map corresponding in position with the environs with respect to their occupancy state with obstacles on the basis of the measured results;

noting which sensors have measured a respective cell for a cell identifiable per measuring sensor;

evaluating a measuring quality of a first measuring sensor at least with respect to a first cell to see how many other measuring sensors arrive at a same characterization of an occupancy state with respect to an occupancy state of a first cell, evaluating the measuring quality of the first sensor all the greater the more of other sensors confirm its characterization;

implementing a self-test including turning the autonomous mobile unit turns until all measuring sensors have measured at least one obstacle, and determining the measuring quality of the individual measuring sensors on the basis of the evaluation of a plurality of evaluation cells.

10. A method according to claim 1, wherein one of ultrasound and optical measuring sensors are employed.

* * * * *